United States Patent [19]
Yang

[11] Patent Number: 5,824,734
[45] Date of Patent: Oct. 20, 1998

[54] WATERBORNE COATING COMPOSITIONS

[75] Inventor: Philip Yung-Chin Yang, Allentown, Pa.

[73] Assignee: Air Products and Chemicals, Inc., Allentown, Pa.

[21] Appl. No.: 678,000

[22] Filed: Jul. 10, 1996

[51] Int. Cl.$^6$ ................................................. C08L 39/00
[52] U.S. Cl. ............................................................. 524/555
[58] Field of Search ............................................. 524/555

[56] References Cited

U.S. PATENT DOCUMENTS

| | | | |
|---|---|---|---|
| 4,293,471 | 10/1981 | Heiberger | 260/22 |
| 4,839,198 | 6/1989 | Lonis et al. | 427/137 |
| 5,340,870 | 8/1994 | Clinnin et al. | 524/522 |

FOREIGN PATENT DOCUMENTS

| | | | |
|---|---|---|---|
| 0409459 | 1/1991 | European Pat. Off. . | |
| 6-212118 | 8/1994 | Japan . | |

*Primary Examiner*—Edward J. Cain
*Attorney, Agent, or Firm*—Russell L. Brewer

[57] ABSTRACT

Disclosed is an improved fast dry and extremely durable waterborne, coating composition particularly adapted for use as a traffic paint. The basic waterborne coating for traffic paint is comprised of an aqueous emulsion containing an acrylic film forming polymer, a stabilizing system for the emulsion which is pH sensitive, and mineral pigment. The improvement to the basic water borne coating for traffic paint resides in utilizing a hydrophobic acrylate containing polymer which incorporates from about 0.1 to 5% by weight of an secondary or tertiary amino acrylate and a crosslinkable monomer as components of the hydrophobic polymer. The hydrophobic acrylate containing polymer should contain less than 5 weight percent of hydrophilic monomers.

9 Claims, No Drawings

WATERBORNE COATING COMPOSITIONS

TECHNICAL FIELD

This invention relates to waterborne coating compositions particularly suited for use in marking road surfaces.

BACKGROUND OF THE INVENTION

Paints and other types of coating materials have long been used to protect surfaces and also provide identification as marking purposes. Durability of the coating is important in many applications. For traffic marking application on road surfaces, the drying speed of the coating so as to resist smearing immediately after application and durability of the paint are particularly important properties. Being able to dry under a high humidity condition is also critical. Maximum drying times of 120 minutes are required per Federal specification TTP-19520 and it is preferred that drying times be less than 75 minutes at 90% relative humidity.

Solvent based materials have been widely used in the past because of their durability and fast dry properties. But, they have fallen in disfavor because of their release of environmentally polluting organic solvents into atmosphere. Waterborne acrylic coatings have been receiving considerable attention because of their environmental friendliness. However, even though the waterborne coatings are environmentally friendly, their acceptance has suffered primarily because of their poor durability and poor drying speed. Epoxy or unsaturated polyester coatings have also been utilized because of their durability, but these polymer systems are expensive.

The following patents are cited and referred to as exemplary of prior art approaches to the development of waterborne paint and coating compositions, some of which have fast dry characteristics and are particularly suited for road surface application.

U.S. Pat. No. 4,293,471 discloses a fast drying alkyd latex which incorporates a vinyl emulsion polymer. This polymeric emulsion is made by a two stage process wherein a water dispersible alkyd resin is formed by conventional procedures, neutralized with ammonia and then a vinyl emulsion formed in the presence of the alkyd resin. A wide range of monomers could be used in producing the vinyl emulsion which included the lower alkyl acrylates, styrene and vinyl toluene. A high pH is used to maintain stability of the emulsion, the coating drying to a tack free state within 30 to 45 minutes. Final cure is reportedly achieved in about 12 hours.

U.S. Pat. No. 4,839,198 discloses a paint composition having application as a road marking composition and one which has rapid drying properties. The composition comprises an aqueous dispersion of a film forming polymer, preferably stabilized with an anionic emulsifier. Example of film forming polymers include styrene/acrylates optionally containing small levels of polymerized acid monomers, e.g., acrylic and methacrylic acid. A variety of fillers (pigments) are incorporated into the paint composition. After the film forming emulsion is applied to the road surface, a water soluble salt is applied to the film to enhance the drying rate.

European Patent 409 459 A2 discloses an aqueous coating composition comprising an aqueous, anionically stabilized polymeric binder system, a polyfunctional amine and a volatile base. An anionically stabilized latex containing polymerized acrylate units, and optionally polymerized acid monomer is mixed with an amine polymer. The amine polymer is water soluble and can be formed from a wide range of nitrogen containing monomers, such as, aminoalkylvinyl ethers, aminoethylacrylamides, aminoethylacrylates, N-acryloxyalkyl-oxazolidines and so forth. The amine containing monomer typically is present in an amount of at least 20% by weight. Due to the incompatibility of the anionic stabilization system, and the water-soluble polyfunctional amine polymer, the aqueous coating material is limited to a low total solids, e.g., 50%.

U.S. Pat. No. 5,340,870 discloses a waterborne paint for traffic marking. The paint comprises a support polymer of styrene and acrylic acid and a hydrophobic emulsion polymer of acrylic esters. In aqueous emulsion, the support polymer keeps the emulsion polymer in micelles and stabile.

Japanese Publication 6-212118 discloses an acrylic resin based upon a polymer of N-vinylformamide and acrylic monomer. The polymer incorporates from about 1 to 20% by weight of N-vinylformamide. After polymerization the amide is hydrolyzed to the amine. Enhanced pigment dispersability is an advantage of the emulsion.

SUMMARY OF THE INVENTION

This invention relates to an improved fast dry and extremely durable waterborne, coating composition particularly adapted for use as a traffic paint. The basic waterborne coating for traffic paint is comprised of an aqueous emulsion containing an acrylic film forming polymer, a stabilizing system for the emulsion which is pH sensitive, and mineral pigment. The improvement to the basic water borne coating for traffic paint resides in utilizing a hydrophobic acrylate containing polymer which incorporates from about 0.1 to 5% by weight of an secondary or tertiary amino acrylate and a crosslinkable monomer as components of the hydrophobic polymer. The hydrophobic acrylate containing polymer should contain less than 5 weight percent of hydrophilic monomers.

There are significant advantages associated with the aqueous emulsion of this invention and these include:

an ability to formulate a paint composition that has fast drying characteristics even under high humidity conditions;

an ability to produce a paint formulation in an aqueous system thus eliminating environmentally unacceptable organic solvents;

an ability to provide a paint formulation or coating having excellent durability and scrub resistant properties (sometimes better than several hundred percent as compared to commercially available products);

an ability to incorporate inorganic pigments at high levels and yet maintain emulsion stability; and, an ability to produce a scrub resistant, emulsion polymerized polymeric binder for traffic paint formulations while achieving a high total polymeric solids level, e.g., 58% with low viscosity and colloidal stability.

DETAILED DESCRIPTION OF THE INVENTION

Hydrophobic polymers utilized in the fast dry paint formulations are derived primarily from hydrophobic, acrylic monomers. Other hydrophobic monomers useful in this invention are copolymerizable monomers having at least one double bond and a water solubility of less than 10 grams per 100 grams of water, preferably less than 5 grams per 100 grams of water, and most preferably less than 2 grams monomer per 100 grams of water. A small portion of hydrophilic monomers may be incorporated into the polymer, but of course the water retention characteristics of these monomers may add to the drying time. Typically, the combined percentage of hydrophilic monomers, having a solubility higher than 2 grams monomer per 100 grams water, is less than 5 weight percent and preferably less than 3% by weight.

Hydrophobic polymerizable monomers include alkyl esters of acrylic or methacrylic acid having an alkyl ester portion containing between 1 to 12 carbon atoms. As is known, the acrylate esters are more hydrophilic than are the methacrylate esters and acrylate esters such as methyl acrylate, and ethyl acrylate should be limited in concentration. Typically, the acrylate esters should have at least 4 carbon atoms as in butyl acrylate to meet the hydrophobic requirements. Examples of hydrophobic acrylates and methacrylates include, ethyl methacrylate, butyl acrylate, butyl methacrylate, propyl methacrylate, 2-ethylhexyl acrylate, as well as styrene, alpha-methyl styrene, and ethylene, acrylonitrile, maleate esters such as ethyl maleate and mixtures of the same if necessary to meet the solubility parameters. Ethylenically unsaturated monomers such as acrylic acid or methacrylic acid may be incorporated but they tend to affect stability of the emulsion if present at high levels and they add to the water retention characteristics of the emulsion. Preferred monomers include the methacrylates such as methyl methacrylate.

A combination of monomers is used to provide optimum properties of the paint emulsion. Some of the hydrophobic polymer should comprise a portion of a soft monomer, e.g., butyl acrylate and a hard monomer such as methyl methacrylate. The presence of the soft monomer in the film forming polymer adds to emulsion stability especially when high levels of inorganic pigment is incorporated into the paint formulation. The hard monomer adds to the durability of the paint subsequent to application.

The secondary or tertiary aminoacrylate monomers include amine monomers such as diethylaminoethyl acrylate, diethylaminoethyl methacrylate, dimethylaminoethyl acrylate, dimethylaminoethyl methacrylate, dimethylaminopropyl acrylate and dimethylaminopropyl methacrylate, tertiary butylaminoethyl acrylate; tertiary butylaminoethyl methacrylate; di-tertiary butylaminoethyl acrylate and di-tertiary butylaminoethyl methacrylate. Other acrylates include 2-aminoethyl acrylate, 2-aminoethyl methacrylate, 2-methylaminoethyl acrylate and methacrylate, 3-aminopropyl methacrylate.

Crosslinkable monomers polymerizable with the hydrophobic acrylic monomers and the secondary or tertiary amino acrylates are incorporated into the polymer in an amount of from about 0.1 to about 5% by weight. The crosslinkable monomers are N-alkylolamide of alpha, beta ethylenically unsaturated carboxylic acids having 3–10 carbon s such as N-methylol acrylamide, N-methylol methacrylamide, N-ethanol acrylamide, N-ethanol methacrylamide.

The hydrophobic polymers preferably are comprised of the following monomer components:

| (a) | methyl methacrylate | 40 to 65%, preferably 50 to 60% by weight |
|---|---|---|
| (b) | butyl acrylate | 35 to 60% preferably 40 to 50% by weight |
| (c) | styrene | 0 to 60% preferably 0 to 40% by weight |
| (d) | aminoethylacrylates | 0.5 to 5% preferably 0.5 to 3% by weight; |
| (e) | unsaturated carboxylic acids other hydrophilic monomers | 0 to 3% by weight; and |
| (f) | N-alkylolamide | 0.1 to 5% by weight |

The hydrophobic emulsion polymer binder of this invention is made by a direct emulsion polymerization process, which polymeric binder typically is composed of 92–99.9 parts per hundred parts monomers by weight (phm) of hydrophobic ethylenically unsaturated monomers, 0.1–5 phm of nitrogenous monoethylenically unsaturated amine or amide functional monomers and optionally from 0 to 3% of an unsaturated acid such as acrylic or methacrylic acid. Preferably, the emulsion polymer has a glass transition temperature (Tg) ranging from −5° to 40° C., and most preferably between +10 to 30° C.

Emulsion polymerization of ethylenically unsaturated monomers to produce a pH sensitive emulsion is well known and conventional emulsion polymerization processes can be used to form the hydrophobic copolymers incorporating the amine or amide functionality. Emulsion polymerization of the ethylenically unsaturated monomers is effected in an aqueous medium under pressures generally not exceeding 1000 atmospheres in the presence of a catalyst (initiator). The emulsion polymerization process may be a batch process which involves a homogenization period in which a portion of the monomer is suspended in water and is thoroughly agitated in the presence of a comonomer such as ethylene while the system is gradually heated to polymerization temperature. The homogenization period is followed by a polymerization period during which the initiator system, which consists of generally of a peroxide and an activator, (as described in the literature), which are added incrementally. Alternatively, the emulsion polymerization process can rely on incremental addition of the monomers in order to produce a copolymer having a desirable distribution of the comonomers. In that case, water and the stabilizing system are added to the reactor with the monomers being added incrementally (delay addition) over time. The catalyst system comprising the oxidizing agent and reducing agent or thermal initiator are added to maintain a preselected reaction rate.

The stabilizing system is one that is pH sensitive. By that it is meant that a small change in pH, effects a collapse of the emulsion and the water is exuded from the amide or amine/acrylate containing film forming hydrophobic polymer. In the emulsion polymerization process at least one emulsifying agent in combination with a suitable buffering agent is used to maintain the emulsion within a preselected pH range, typically a pH of at least 7. Subsequent to the polymerization, the pH of the emulsion is raised to a level above 7, e.g., 8 to about 9.5. On reduction of the pH, the emulsion will collapses due to the high loading of mineral pigment, etc. thereby permitting fast drying through the exudation of water.

A wide variety of emulsifying agents can be used in generating the pH sensitive stabilizing system for effecting emulsion polymerization of the monomer systems. Typically, a combination of nonionic and anionic surfactants are used to stabilize the system, stability being maintained by the addition of a base raising the pH of the emulsion as stated before. Typically, the base is volatile, e.g., ammonia and is added in an amount sufficient to deprotonate the nitrogen containing monomer.

Suitable non-ionic emulsifying agents include polyoxyethylene condensates. Polyoxyethylene condensates may be represented by the general formula:

$$R(CH_2\text{—}CH_2\text{—}O)_nH$$

where R is the residue of a fatty alcohol containing 10–18 carbon atoms, an alkyl phenol, a fatty acid containing 10–18 carbon atoms, an amide, an amine, or a mercaptan, and where n is an integer of 1 to 50 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thioethers such as polyoxyethylene n-dodecyl thioether.

One class of non-ionic emulsifying agents which can be used include a series of surface active agents known as "Pluronics." The "Pluronics" have the general formula:

$$HO(C_2H_4O)_a(C_3H_6O)_b(C_2H_4O)_cH$$

where a, b, and c are integers of 1 or above. As b increases, the compounds become less water soluble or more oil soluble and thus more hydrophobic when a and c remain substantially constant.

Some examples of nonionic emulsifying agents sold under the Pluronic trademark which can be used include polyoxyethylene-polyoxypropylene glycols conforming to the above general formula for "Pluronics" in which the polyoxypropylene chain has a molecular weight of 1500 to 1800 and the polyoxyethylene content is from 40 to 50 percent of the total weight of the molecule, a polyoxypropylene having a cloud point of about 140° F. and marketed under the trademark "Pluronic L-64"; a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule and having a cloud point of about 212° F. and marketed under the trade mark "Pluronic F-68". "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

Another class of nonionic surfactants are sold under the Igepal trademark. One example within this class is a polyoxyethylene nonylphenyl ether having a cloud point of between 126° and 133° F. and marketed under the trade mark "Igepal CO-630"; another is polyoxyethylene nonylphenyl ether having a cloud point above 212° F. and marketed under the trade mark "Igepal CO-887." A similar polyoxyethylene nonylphenyl ether with a cloud point of about 86° F. is marketed under the trade mark "Igepal CO-610." Surfactants similar to the Igepal surfactants include a polyoxyethylene octylphenyl ether having a cloud point of between 80° F. and 160° F. marketed under the trademark "Triton X-100", a polyoxyethylene oleyl ether having a cloud point of between 80° F. and 160° F. marketed under the trade mark "Atlas G-3915" and a polyoxyethylene lauryl ether having a cloud point above 190° F. marketed under the trademark "Brij 35."

Anionic surfactants have also been widely use to produce the polymer systems for the coating compositions and can be used in producing the pH sensitive emulsions. Representative anionic surfactants include alkali metal alkyl sulfates such as sodium lauryl sulfate, and the ammonium or sodium salt of sulfate or phosphate ester r alkylphenoxy poly (ethyleneoxy)ethanol, where the oxyethylene content is from 3 to 40 moles per alkyl phenol, complex organic phosphates (sold under the trademark GAFAC), alkylaryl sulfonates such as sodium dodecylbenzene sulfonate, sodium dodecyldiphenyl ether disulfonate and so forth.

It is preferred that the nonionic surfactant level be maintained as low as possible because its presence affects the water resistance of the resulting coating. Usually, a combination of the anionic surfactant coupled with base is sufficient to maintain stability. The fact that the hydrophobic polymer incorporates the nitrogen containing monomer also enhances the overall stability of the system at reduced surfactant levels.

Various free-radical forming initiators such as peroxide compounds can be used in carrying out the emulsion polymerization of the monomers. Combination-type initiators employing both reducing agents and oxidizing agents can also be used. The use of this type of combined initiator is generally referred to in the art as "redox polymerization" or "redox system." The reducing agent is also often referred to as an activator and the oxidizing agent as an initiator. Suitable reducing agents or activators include bisulfites, sulfoxylates, or other compounds having reducing properties such as ferrous salts and ascorbic acid, and tertiary aromatic amines, e.g., N,N-dimethylaniline. The oxidizing agents or initiators include hydrogen peroxide, organic peroxides such as benzoyl peroxide, t-butyl hydroperoxide. A specific combination-type initiator or redox system which can be used is hydrogen peroxide and sodium formaldehyde sulfoxylate. Thermal initiators include persulfates, such as ammonium or potassium persulfate, or perborates, peracid anhydrides, percarbonates azo compounds, peresters and the like.

The initiator is employed in the amount of 0.1 to 2%, preferably 0.25 to 0.75%, based on the weight of monomer introduced into the system. The activator is ordinarily added as an aqueous solution and the amount of activator is generally from 0.25 to 1 times the amount of initiator.

The concentration range of the stabilizing agents used in emulsion polymerization is from 0.5 to 10% based on the aqueous phase of the latex regardless of the solids content. The stabilizers employed are, in part, governed by the use to which the copolymer latex is to be put. By utilizing appropriate levels of surfactant and/or protective colloid, one can obtain latex polymer particles having a variety of average particle size ranges and distributions.

In order to maintain the pH of the system at the desired value, there is suitably added a buffering agent of any convenient type. Any alkaline material which is compatible with the stabilizing agent can be used as the buffer. The amount of buffer is that sufficient to adjust the pH of the system within the desired range, e.g., 7 to 11 and preferably 8 to 10. Final pH adjustment is typically effected through the use of a volatile amine or ammonia. Representative amines include methyl amine, diethylamine, triethylamine, ethanolamine, morpholine, etc.

The coating compositions of the present invention contain a high level of inorganic or mineral pigment. These high pigment levels also act to enhance the drying rate of the composition. Conventional paints may utilize pigment and filler in an amount from about 20 to 35% solids by volume while traffic paints may utilize inorganic pigment and filler in a range from 28 to 39% solids by volume (52 to 62% by weight). The high level of pigment also affects the stability of the emulsion and The inorganic pigments include titanium dioxide, calcium carbonate, iron oxide, carbon black, silica, kaolin, talc, barium sulfate, etc. In sum, the total solids of the paint formulation including polymer, pigment and filler will typical range from about 70 to 80% by weight and 55 to 65% by volume. Many state departments of transportation specify a range from 72.5 to 77.7% by weight total solids and 57.1 to 61.8% by volume.

EXAMPLE 1

Dimethylaminoethyl Methacrylate and N-Methylolacrylamide Containing Acrylate Emulsion Stabilized with Aliphatic Phosphate A fast dry durable coating material produced in accordance with the present invention was made as follows. A hydrophobic nitrogenous functional polymer emulsion was prepared by adding 234 grams deionized water into a stirred 2-liter glass reactor, followed by 0.1 grams of Rhodafac RS-710 (aliphatic phosphate ester, Rhone-Poulenc), 2.79 grams of 28% ammonium hydroxide, and 4.29 grams of ammonium persulfate. A premix was prepared by mixing 234 grams of deionized water, 11.7 grams of Rhodafac RS-710 (aliphatic phosphate ester, Rhone-Poulenc), 7.8 grams of Igepal CO-630 (nonylphenol ethoxylate, Rhone-Poulenc), 4.14 grams of 28% ammonium hydroxide, 429 grams of methyl methacrylate (MMA), 342.4 grams of butyl acrylate (BA), 4.68 grams of dimethylaminoethyl methacrylate (DMAEM), and 8.13 grams 48% N-methylolacrylamide (NMA). The polymer comprised, on a weight basis, 55% MMA, 43.8% BA, 0.6% DMAEM and 0.5% NMA.

The reactor was kept at 80° C. in a nitrogen blanket with agitation. The premix was metered into the reactor over 3 hours. At the end of the monomer premix metering, an ammonium persulfate solution (0.62 grams of ammonium persulfate in 7.8 grams of deionized water) was charged into the reactor. The reactor was kept at 80° C. for another 90 minutes. The remained monomers were reacted away at 50° C. for 1 hour with 1.11 grams t-butyl hydroperoxide, and 1.56 grams sodium formaldehyde sulfoxylate. The resulting emulsion was adjusted to a pH of 9 with 3.1 grams of 28% ammonium hydroxide. The resulting polymer emulsion has a total solids of 58.4%, and a Brookfield viscosity of 61 cps.

EXAMPLE 2

Fast Dry Paint Formulation and Test Evaluation

A coating material was made by mixing 105.2 grams of the Example 1 emulsion with 2.08 grams of Surfynol RC-294-J13 acetylenic glycol surfactant, 0.675 grams of Drew L-493 defoamer, 25 grams of titanium dioxide, 175 grams of calcium carbonate, 6.6 grams of methanol, 6.15 grams of Texanol ester-alcohol coalescent agent, 0.375 grams of Kathon LX biocide, 2.1 grams of 2% Natrosol 250 HR thickener, and 19.67 grams of water. the coating formulation had a viscosity of 99 KU.

Thirteen mil thick of this coating material was applied to a glass plate. It took 6 minutes to dry to light print at 50% relative humidity, and 90 minutes to dry to light print at 90% relative humidity.

A control coating material made sold under the trademark Flexbond based upon an acrylic emulsion (acid number 11.7) and containing MMA, BA, methacrylic acid and NMA took 14 minutes to dry to light print at 50% relative humidity, and did not dry in 2 hours at 90% relative humidity. A 2 hour dry time at 90% relative humidity is the Federal Specification TT-P-1952D requirement.

The results show the importance of the aminoacrylate in enhancing the drying rate of the traffic paint.

EXAMPLE 3

Dimethylaminoethyl Methacrylate and N-Methylolacrylamide Containing Emulsion Stabilized with Ethoxylate of sulfated Alkylphenol A fast dry durable coating was made as follows. A hydrophobic nitrogenous functional polymer emulsion was prepared by adding 229 grams deionized water into a stirred 2-liter glass reactor, followed by 0.1 grams of Rhodapex CO-433 (sodium salt of sulfated alkylphenol ethoxylate, Rhone-Poulenc), 2.82 grams of 28% ammonium hydroxide, and 1.58 grams of ammonium persulfate. A premix then was prepared by mixing 229 grams of deionized water, 16.46 grams of Rhodapex CO-433 (sodium salt of sulfated alkylphenol ethoxylate, Rhone-Poulenc), 7.9 grams of Igepal CO-630 (nonylphenol ethoxylate, Rhone-Poulenc), 4.23 grams of 28% ammonium hydroxide, 425 grams of methyl methacrylate, 355.5 grams of butyl acrylate, 5.53 grams of dimethylaminoethyl methacrylate, and 8.23 grams 48% N-methylolacrylamide. The polymer comprised, on a weight basis, about 53.7% MMA, 45.5% BA, 0.7% DMAEM and 0.5% NMA.

The reactor was kept at 80° C. in a nitrogen blanket with agitation. The premix was metered into the reactor over 3 hours. A ammonium persulfate solution (1.58 grams of ammonium persulfate in 23.7 grams deionized water) was metered evenly into reactor over two hours. At the end of the monomer premix metering, another ammonium persulfate solution (0.4 grams of ammonium persulfate in 7.9 grams deionized water) was charged into the reactor twice. The reactor was kept at 80° C. for another 90 minutes. The remained monomers were reacted away at 50° C. for 90 minutes with 1.13 grams of t-butyl hydroperoxide, and 1.58 grams of sodium formaldehyde sulfoxylate. The resulting emulsion was adjusted to a pH of 9.8 with 16.9 grams of 28% ammonium hydroxide. The resulting polymer emulsion has a total solids of 57.4%, and a Brookfield viscosity of 56 cps.

EXAMPLE 4

Fast Dry Paint Test Evaluation

A coating material was made by mixing 107.3 grams of the Example 3 emulsion with 1.45 grams Tamol 901 (dispersant, Rohm & Haas), 0.63 grams of Triton CF-10 (surfactant, Union Carbide), 0.68 grams of Drew L-493 (defoamer, Drew Chemical), 25 grams of titanium dioxide, 175 grams of calcium carbonate, 6.6 grams of methanol, 6.15 grams of Texanol (ester-alcohol coalescent agent, Eastman Chemical), 0.38 grams of Kathon LX (biocide, Rohm & Haas), 2.1 grams of 2% Natrosol 250 HR (thickener, Aqualon Inc.), and 19.67 grams of water. It has a viscosity of 77 KU.

Thirteen mil thick of this coating material was applied to a glass plate. It took 8 minutes to dry to light print at 50% relative humidity, and 36 minutes to dry to light print at 90% relative humidity. A 1525 cycles of scrub resistance was obtained.

A control coating material made with a Flexbond emulsion (acid number 11.7) had a scrub resistance of 700 cycles.

The results of Examples 1 and 2 show the importance of the combination of the aminoacrylate and N-methylolacrylamide or other crosslinkable monomer in terms of enhancing the drying rate and enhancing the scrub resistance of the paint. The prior art binder when formulated into a traffic paint did not dry nor did it have the scrub resistance.

EXAMPLE 5

Diethylaminoethyl Methacrylate and N-Methylolacrylamide Containing Acrylate Emulsion Stabilized with Anionic Ethoxylate A fast dry durable coating material was made as follows. A hydrophobic nitrogenous functional polymer emulsion was prepared by adding 237 grams deionized water into a stirred 2-liter glass reactor, followed by 0.1 grams of Rhodapex CO-433 (sodium salt of sulfated alkylphenol ethoxylate, Rhone-Poulenc), 2.82 grams of 28% ammonium hydroxide, and 1.58 grams of ammonium persulfate. A premix was prepared by mixing 229 grams of deionized water, 16.46 grams of Rhodapex CO-433 (sodium salt of sulfated alkylphenol ethoxylate, Rhone-Poulenc), 7.9 grams of Igepal CO-630 (nonylphenol ethoxylate, Rhone-Poulenc), 4.23 grams of 28% ammonium hydroxide, 425 grams of methyl methacrylate, 355.5 grams of butyl acrylate, and 5.53 grams of diethylaminoethyl methacrylate and 8.23 grams of 48% N-methylol acrylamide. The polymer comprised, on a weight basis, about 53.8% MMA, 45% BA, 0.7% DEAEM and 0.5% NMA.

The reactor was kept at 80° C. in a nitrogen blanket with agitation. The premix was metered into the reactor over 3 hours. A ammonium persulfate solution (1.58 grams of ammonium persulfate in 23.7 grams deionized water) was metered evenly into reactor over two hours. At the end of the monomer premix metering, another ammonium persulfate solution (0.4 grams of ammonium persulfate in 7.9 grams deionized water) was charged into the reactor twice. The reactor was kept at 80° C. for another 90 minutes. The remained monomers were reacted away at 50° C. for 90 minutes with 1.13 grams of t-butyl hydroperoxide, and 1.58 grams of sodium formaldehyde sulfoxylate. The resulting emulsion was adjusted to a pH of 9.8 with 9.1 grams of 28% ammonium hydroxide. The resulting polymer emulsion has a total solids of 56.2%, and a Brookfield viscosity of 38 cps.

EXAMPLE 6

Fast Dry Paint Formulation and Test Evaluation

A coating material was made by mixing 109.3 grams of the Example 7 emulsion with 1.45 grams Tamol 901 (dispersant, Rohm & Haas), 0.63 grams of Triton CF-10 (surfactant, Union Carbide), 0.68 grams of Drew L-493 (defoamer, Drew Chemical), 25 grams of titanium dioxide, 175 grams of calcium carbonate, 6.6 grams of methanol, 6.15 grams of Texanol (ester-alcohol coalescent agent, Eastman Chemical), 0.38 grams of Kathon LX (biocide, Rohm & Haas), 2.1 grams of 2% Natrosol 250 HR (thickener, Aqualon Inc.), and 15.56 grams of water. It has a viscosity of 80 KU.

Thirteen mil thick of this coating material was applied to a glass plate. It took 7 minutes to dry to light print at 50% relative humidity, and 36 minutes to dry to light print at 90% relative humidity. A value of 2120 cycles of scrub resistance was obtained.

COMPARATIVE EXAMPLE 7

Coating Emulsion Containing Methacrylic Acid and No Nitrogen Containing Monomer

This comparative example of coating material was made using a emulsion made with a significant level of hydrophilic monomer, e.g., methacrylic acid and no aminoacrylate or N-methylolacrylamide. In forming this emulsion, 213 grams of deionized water were added into a stirred 2-liter glass reactor, followed by 0.5 grams of 30% sodium lauryl sulfate, and 1.52 grams of ammonium persulfate. A premix was prepared by mixing 228 grams of deionized water, 2.71 grams of 28% ammonium hydroxide, 25.33 grams of sodium lauryl sulfate, 11.4 grams of, 7.9 grams of Igepal CO-630 (nonylphenol ethoxylate, Rhone-Poulenc), 38 grams of methyl methacrylate, 372.4 styrene (ST), 345.8 grams of butyl acrylate, and 3.8 grams of methacrylic acid (MAA).

The reactor was kept at 81° C. in a nitrogen blanket with agitation. The premix was metered into the reactor over 3 hours. A ammonium persulfate solution (3.04 grams of ammonium persulfate in 30.4 grams of deionized water) was metered evenly into reactor over three hours. At the end of the monomer premix metering, another ammonium persulfate solution (0.61 grams of ammonium persulfate in 15.2 grams deionized water) was charged into the reactor twice. The reactor was kept at 81° C. for another 2 hours. The remained monomers were reacted away at 50° C. for 60 minutes with 1.09 grams of t-butyl hydroperoxide, and 1.52 grams of sodium formaldehyde sulfoxylate. The polymer comprised, on a weight basis, about 4.8% MMA, 47% ST, 43.9% BA and 0.48% MAA, a total solids of 55.6%, and a Brookfield viscosity of 150 cps.

A coating material was made by mixing 110.5 grams of the emulsion with 1.45 grams Tamol 901(dispersant, Rohm & Haas), 0.63 grams of Triton CF-10 (surfactant, Union Carbide), 0.68 grams of Drew L-493 (defoamer, Drew Chemical), 25 grams of titanium dioxide, 175 grams of calcium carbonate, 6.6 grams of methanol, 6.15 grams of Texanol (ester-alcohol coalescent agent, Eastman Chemical), 0.38 grams of Kathon LX (biocide, Rohm & Haas), 2.1 grams of 2% Natrosol 250 HR (thickener, Aqualon Inc.), and 14.37 grams of water. It has a viscosity of 77 KU.

COMPARATIVE EXAMPLE 8

Emulsion 9 Evaluation

Thirteen mil thick of the emulsion of Example 9 was applied to a glass plate. It took 15 minutes to dry to light print at 50% relative humidity, and did not dry after 2 hours at 90% relative humidity. Because the emulsion was not fast drying as compared to Examples 1 and 3, no further evaluation was made.

COMPARATIVE EXAMPLE 9

Styrene 2-Ethylhexylacrylate Containing Emulsion Stabilized with Aliphatic Phosphate, No Aminoacrylate Monomer This comparative example of coating material was made using inorganic pigments and an emulsion made without a significant level of nitrogen containing functional monomer. 248 grams of deionized water was added into a stirred 2-liter glass reactor, followed by 0.16 grams of Rhodafac RS-710 (aliphatic phosphate ester, Rhone-Poulenc), 2.86 grams of 28% ammonium hydroxide, and 4.4 grams of ammonium persulfate. A premix was prepared by mixing 224 grams of deionized water, 12 grams of Rhodafac RS-710 (aliphatic phosphate ester, Rhone-Poulenc), 8 grams of Igepal CO-630 (nonylphenol ethoxylate, Rhone-Poulenc), 2.86 grams of 28% ammonium hydroxide, 472 grams of styrene (ST), 328 grams of 2-ethylhexyl acrylate (EHA). The polymer comprised, on a weight basis, about 59% ST, and 41% EHA.

The reactor was kept at 83° C. in a nitrogen blanket with agitation. The premix was metered into the reactor over 3 hours. A ammonium persulfate solution (3.04 grams of ammonium persulfate in 30.4 grams of deionized water) was metered evenly into reactor over three hours. At the end of the monomer premix metering, another ammonium persulfate solution (0.64 grams of ammonium persulfate in 8 grams deionized water) was charged into the reactor twice. The reactor was kept at 83° C. for another 3 hours. The remained monomers were reacted away at 50° C. for 60 minutes with 1.14 grams of t-butyl hydroperoxide, and 1.6 grams of sodium formaldehyde sulfoxylate. The resulting polymer emulsion has a total solids of 59.6%, and a Brookfield viscosity of 125 cps.

COMPARATIVE EXAMPLE 10

Fast Dry Paint Formulation and Test Evaluation

An attempt to make a coating material employing the Example 11 resulted in failure. It coagulated after mixing 412.2 grams of the Example 11 emulsion with 5.8 grams Tamol 901(dispersant, Rohm & Haas), 2.5 grams of Triton CF-10 (surfactant, Union Carbide), 1 gram of Drew L-493 (defoamer, Drew Chemical), 100 grams of titanium dioxide, and 700.5 grams of calcium carbonate. The material coagulated after the addition of calcium carbonate. The results tend to show the importance of the aminoacrylate monomer and the crosslinkable monomer in terms of paint stability, not to mention the aspect of fast dry and durability.

EXAMPLE 11

Dimethylaminoethyl Methacrylate, N-Methylolacrylamide and Acrylic Acid Containing Emulsion Stabilized with Ethoxylate of Sulfated Alkylphenol A fast dry durable coating was made as follows. A hydrophobic nitrogenous functional polymer emulsion was prepared by adding 237 grams deionized water into a stirred 2-liter glass reactor, followed by 0.1 grams of Rhodapex CO-433 (sodium salt of sulfated alkylphenol ethoxylate, Rhone-Poulenc), 2.82 grams of 28% ammonium hydroxide, and 1.58 grams of ammonium persulfate. A premix then was prepared by mixing 229 grams of deionized water, 16.45 grams of Rhodapex CO-433 (sodium salt of sulfated alkylphenol ethoxylate, Rhone-Poulenc), 7.9 grams of Igepal CO-630 (nonylphenol ethoxylate, Rhone-Poulenc), 5.64 grams of 28% ammonium hydroxide, 421.1 grams of methyl methacrylate, 355.5 grams of butyl acrylate, 5.53 grams of dimethylaminoethyl methacrylate, 8.23 grams 48% N-methylolacrylamide and 3.95 grams of acrylic acid (AA).

The reactor was kept at 80° C. in a nitrogen blanket with agitation. The premix was metered into the reactor over 3 hours. A ammonium persulfate solution (1.58 grams of ammonium persulfate in 23.7 grams deionized water) was metered evenly into reactor over two hours. At the end of the monomer premix metering, another ammonium persulfate solution (0.4 grams of ammonium persulfate in 7.9 grams deionized water) was charged into the reactor twice. The reactor was kept at 80° C. for another 90 minutes. The remained monomers were reacted away at 50° C. for 90 minutes with 1.13 grams of t-butyl hydroperoxide, and 1.58 grams of sodium formaldehyde sulfoxylate. The resulting emulsion was adjusted to a pH of 9.8 with 16.9 grams of 28% ammonium hydroxide. The polymer comprised, on a weight basis, about 53.3% MMA, 45% BA, 0.7% DMAEM 0.5% NMA and 0.5% AA. The resulting polymer emulsion had a total solids of 56.8%, and a Brookfield viscosity of 113 cps.

EXAMPLE 12

Fast Dry Paint Formulation and Test Evaluation

A coating material was made by mixing 107.3 grams of the Example 13 emulsion with 1.45 grams Tamol 901 (dispersant, Rohm & Haas), 0.63 grams of Triton CF-10 (surfactant, Union Carbide), 0.68 grams of Drew L-493 (defoamer, Drew Chemical), 25 grams of titanium dioxide, 175 grams of calcium carbonate, 6.6 grams of methanol, 6.15 grams of Texanol (ester-alcohol coalescent agent, Eastman Chemical), 0.38 grams of Kathon LX (biocide, Rohm & Haas), 2.1 grams of 2% Natrosol 250 HR (thickener, Aqualon Inc.), and 19.67 grams of water. It has a viscosity of 85 KU.

Thirteen mil thick of this coating material was applied to a glass plate. It took 14 minutes to dry to light print at 50% relative humidity, and 45 minutes to dry to light print at 90% relative humidity. A 1000 cycles of scrub resistance was obtained. It was believed that scrub resistance was reduced because of the presence of the hydrophilic monomer, acrylic acid.

COMPARATIVE EXAMPLE 13

Emulsion Stabilized with Ethoxylate of Sulfated Alkylphenol Containing No Nitrogen Monomer A polymer emulsion was prepared by adding 221 grams deionized water into a stirred 2-liter glass reactor, followed by 0.1 grams of Rhodapex CO-433 (sodium salt of sulfated alkylphenol ethoxylate, Rhone-Poulenc), 2.82 grams of 28% ammonium hydroxide, and 1.58 grams of ammonium persulfate. A premix then was prepared by mixing 221.2 grams of deionized water, 20.03 grams of Rhodapex CO-433 (sodium salt of sulfated alkylphenol ethoxylate, Rhone-Poulenc), 9.43 grams of Igepal CO-630 (nonylphenol ethoxylate, Rhone-Poulenc), 4.28 grams of 28% ammonium hydroxide, 426 grams of methyl methacrylate and 363.4 grams of butyl acrylate.

The reactor was kept at 80° C. in a nitrogen blanket with agitation. The premix was metered into the reactor over 3 hours. A ammonium persulfate solution (1.58 grams of ammonium persulfate in 23.7 grams deionized water) was metered evenly into reactor over two hours. At the end of the monomer premix metering, another ammonium persulfate solution (0.4 grams of ammonium persulfate in 7.9 grams deionized water) was charged into the reactor twice. The reactor was kept at 80° C. for another 90 minutes. The remained monomers were reacted away at 50° C. for 90 minutes with 1.13 grams of t-butyl hydroperoxide, and 1.58 grams of sodium formaldehyde sulfoxylate. The resulting emulsion was adjusted to a pH of 9.9 with 11.8 grams of 28% ammonium hydroxide. The polymer comprised, on a weight basis, about 54% MMA and 46% BA. The resulting polymer emulsion had a total solids of 59.1% and a Brookfield viscosity of 50 cps.

EXAMPLE 14

Fast Dry Paint Formulation and Test Evaluation

A coating material was made by mixing 107.3 grams of the Example 15 emulsion. Sedimentation occurred when the emulsion was made into the coating, i.e., the emulsion became unstable. These results show the importance of the combination of monomers vis-à-vis Examples 1 and 3.

EXAMPLE 15

Vinyl Acetate/Ethylene Polymer

The procedure of Example 3 was followed except that the polymer was a copolymer of vinyl acetate and ethylene (85.5% vinyl acetate and 14.5% ethylene). A stable coating was prepared as in Example 4 except that the coating took more than 12 minutes to dry at 50% relative humidity and did not dry after 2 hours at 90% humidity. The sample was not evaluated for scrub resistance; it was believed that the polymer would have a much lower scrub resistance than the Example 4 formulation.

SUMMARY

In summary, Examples 1 and 2 show that a fast dry paint system based upon a hydrophobic monomer, an alkyl amine acrylate, viz., DMAEM, and NMA cross-linking agent provides dry times of a few minutes and Example 2 showing the excellent scrub resistance of the paint composition.

Examples 3 and 4 demonstrate a fast dry paint system similar to Examples 1 and 2 except that a an ethoxylated sodium salt of a sulfated alkylphenol was substituted for the aliphatic phosphate. The dry time was only slightly longer than those example while scrub resistance was similar.

Examples 5 and 6 demonstrate a fast dry paint system based upon an emulsion similar to that of Example 3 except that diethylaminoethyl acrylate was used as the aminoacrylate monomer. The results were similar to Examples 3 and 4.

Examples 7 and 8 show the effect of the hydrophobic polymer based upon methyl methacrylate, styrene, butyl acrylate and the replacement of the aminoacrylate monomer with methacrylic acid. The emulsion experienced an extended drying period.

Examples 9 and 10 show the effect of using a hydrophobic polymer based upon styrene and butyl acrylate with the elimination of methyl methacrylate as employed in Example 9. No aminoacrylate monomer or acid containing monomer was employed. The system was not stable in the presence of mineral pigments.

Examples 11 and 12 show the effect of using a hydrophobic polymer based upon methyl methacrylate as in Example 3 except that acrylic acid was added. The system was stable in the presence of mineral pigments; it had a slightly lower scrub resistance.

Examples 13 and 14 show the effect of using a conventional vinyl acetate ethylene copolymer which is relatively hydrophilic as compared to the hydrophobic polymers of Examples 1 and 3. No aminoacrylate monomer or acid containing monomer was employed. The system was stable but took a substantial amount of time to dry.

What is claimed is:

1. In a waterborne coating composition comprised of an aqueous emulsion containing an acrylic film forming polymer, a stabilizing system for the emulsion which is pH sensitive, and mineral pigment, the improvement which comprises:

an acrylic film forming polymer formed from hydrophobic polymerizable monomers comprised of alkyl esters of acrylic or methacrylic acid having an alkyl ester portion containing between 1 to 12 carbon atoms and a water solubility of less than 2 grams per 100 grams of water, from about 0.1 to 5% by weight of a secondary or tertiary aminoacrylate monomer aminoacrylate monomer selected from the group consisting of dimethylaminoethyl acrylate, dimethylaminoethyl methacrylate, diethylaminoethyl acrylate, diethylaminoethyl methacrylate, tertiary butylaminoethyl acrylate and tertiary butylaminoethyl methacrylate; and, from 0.1 to 5% by weight of a crosslinkable monomer selected from the group consisting of acrylamide, methacrylamide and N-methylol acrylamide; and, said acrylic film forming polymer having less than 3 weight percent of hydrophilic monomer incorporated therein.

2. The waterborne coating composition of claim 1 wherein the acrylic film forming polymer has a glass transition temperature between −5° to 40° C.

3. The waterborne coating composition of claim 2 wherein the mineral pigments include titanium dioxide, calcium carbonate, iron oxide, carbon black, silica, kaolin, talc, and barium sulfate.

4. The waterborne coating composition of claim 2 wherein the weight percent of the polymer binder is from about 15 to 20% and the mineral pigment is present in an amount from 55 to 62% by weight.

5. The waterborne coating composition of claim 4 wherein acrylate monomers utilized in forming the hydrophobic polymer are selected from the group consisting of methyl acrylate, methyl methacrylate, ethyl acrylate, ethyl methacrylate, butyl acrylate, butyl methacrylate, propyl acrylate, propyl methacrylate, and 2-ethylhexyl acrylate.

6. In an aqueous emulsion comprising an acrylic film forming polymer, a stabilizing system for the emulsion which is pH sensitive, and mineral pigment, said emulsion adapted for use in traffic paints, the improvement which comprises:

an acrylic film forming polymer formed from hydrophobic polymerizable monomers comprised of alkyl esters of acrylic or methacrylic acid having an alkyl ester portion containing between 1 to 12 carbon atoms and a water solubility of less than 2 grams per 100 grams of water, from about 0.1 to 5% by weight of a secondary or tertiary aminoacrylate monomer aminoacrylate monomer selected from the group consisting of dimethylaminoethyl acrylate, dimethylaminoethyl methacrylate, diethylaminoethyl acrylate, diethylaminoethyl methacrylate, tertiary butylaminoethyl acrylate and tertiary butylaminoethyl methacrylate; and, from 0.1 to 5% by weight of a crosslinkable monomer selected from the group consisting of N-methylol acrylamide, N-methylol methacrylamide, N-ethanol acrylamide, N-ethanol methacrylamide, acrylamide, and methacrylamide; and, said acrylic film forming polymer having less than 3 weight percent of a hydrophilic monomer incorporated therein.

7. The aqueous emulsion of claim 6 wherein the acrylic film forming polymer comprises:

| | | |
|---|---|---|
| (a) | methyl methacrylate | 40 to 65 by weight |
| (b) | butyl acrylate | 35 to 60% by weight |
| (c) | styrene | 0 to 40% by weight |
| (d) | aminoalkylacrylates | 0.5 to 5% by weight; |
| (e) | unsaturated carboxylic acids | 0 to 3% by weight; and |
| (f) | N-methylolacrylamide | 0.1 to 5% by weight | and has a glass transition temperature (Tg) between −5° to +40° C.

8. The aqueous emulsion of claim 7 wherein the mineral pigments include titanium dioxide, calcium carbonate, iron oxide, carbon black, silica, kaolin, talc, and barium sulfate.

9. The aqueous emulsion of claim 8 wherein the weight percent of the acrylic film forming polymer is from about 15 to 20% and the mineral pigment is present in an amount from 55 to 62% by weight.

* * * * *